(No Model.)
J. DIXEY, C. GRONBERG & P. HYDEN.
DRILL CHUCK.
No. 375,139. Patented Dec. 20, 1887.
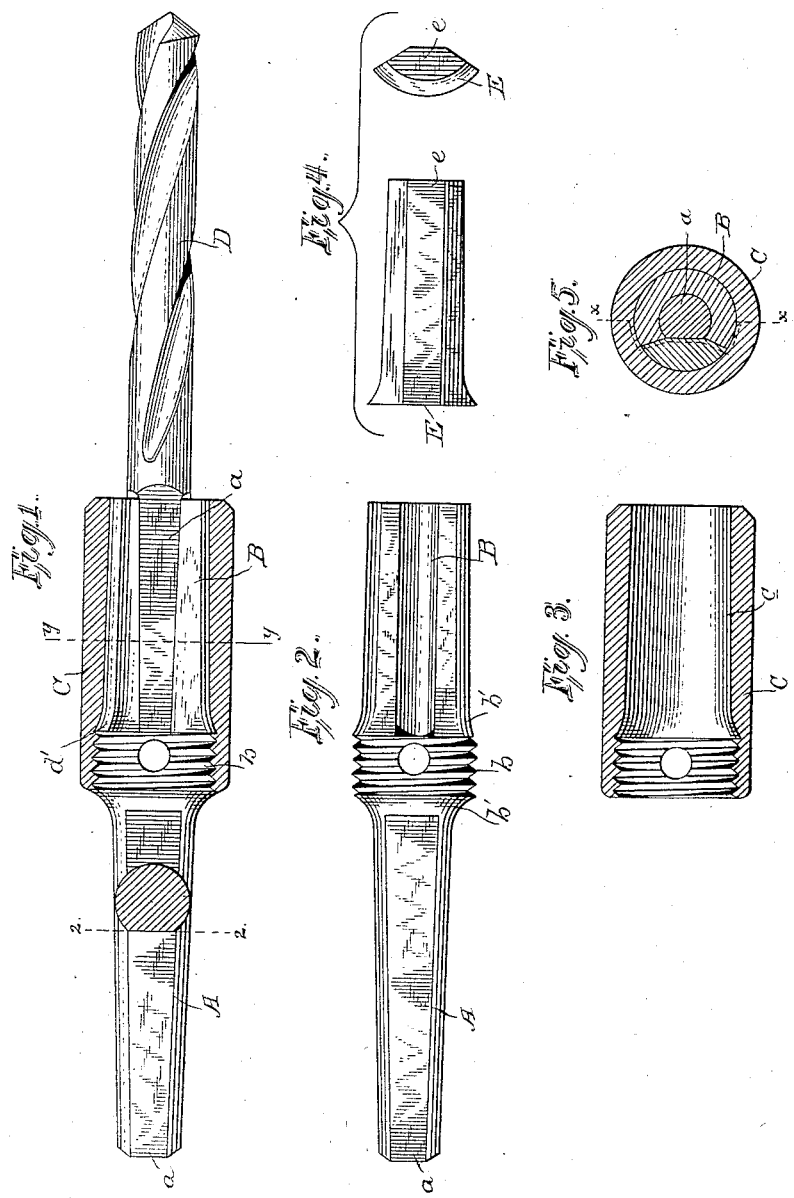
Witnesses.
Preston Phelps
Frank L. Dyer
Inventors.
John Dixey
Charles Gronberg
Peter Hyden.
By Geo W Dyer their atty.

UNITED STATES PATENT OFFICE.

JOHN DIXEY, CHARLES GRONBERG, AND PETER HYDEN, OF PULLMAN, ILLINOIS.

DRILL-CHUCK.

SPECIFICATION forming part of Letters Patent No. 375,139, dated December 20, 1887.

Application filed March 25, 1887. Serial No. 232,381. (No model.)

*To all whom it may concern:*

Be it known that we, JOHN DIXEY, CHARLES GRONBERG, and PETER HYDEN, citizens of the United States, residing at Pullman, in the county of Cook and State of Illinois, have invented certain new and useful Improvements in Drill-Chucks; and we do hereby declare the following to be a full, clear, and exact description of the invention, which will enable others skilled in the art to which it appertains to make and use the same.

Our improvements relate particularly to drill-chucks, but are equally as well adapted to bits and stocks, and, in fact, all tools having shanks which are inserted and secured in the socket of a handle or other holder.

The main object of our improvements is to increase the strength of the tool and prevent it from breaking under a heavy strain by giving its shank a bearing the whole length of the socket in the holder; or, in other words, we do this by making the depth of the socket equal to the length of the shank. In this feature lies the novelty of our invention, together with the means for securing the drill in place against rotary and lateral movement and in the details of construction and arrangement of the several parts, all as will be more fully hereinafter described and claimed.

In the accompanying drawings, which illustrate a combined drill and chuck constructed in accordance with our invention, like letters of reference denote corresponding parts.

Figure 1 represents a longitudinal section on the line $x\ x$ of Fig. 5, with a cross-section of the shank of the chuck shown upon it taken on line 2 2; Fig. 2, a similar section, omitting the outside sleeve of the chuck and the drill; Fig. 3, a longitudinal section of the outside sleeve of the chuck; Fig. 4, a side and end elevation of the key for securing the drill in place, and Fig. 5 a transverse section on the line $y\ y$ of Fig. 1.

The chuck, as illustrated in the drawings, is composed, preferably, of a round shank, A, except where it is made flat on one side, as at $a$, so as to be more securely fastened, and a tapering cylindrical stock, B, the head of which is screw-threaded externally, as at $b$, to receive the outside sleeve, C, which is screwed thereon. The outer end of this stock B is of a smaller diameter than its remaining portion, but gradually increases in diameter externally toward its screw-threaded head $b$, near which point it flares outwardly in a curve, $b'$, which extends to the screw-threads thereof. The inside diameter of the sleeve C corresponds with the outside diameter of the stock B and has a curve, $c$, at the inner end corresponding with the curve $b'$ of the socket B, so that a tight and snugly fitting joint is made between these two parts. This stock B has at its center the usual socket for receiving the shank $d$ of the drill D, and the depth of this socket we make to correspond with the length of the drill-shank, so that said shank has a bearing for its entire length, and thereby gives strength and firmness to the drill.

Both the drill-shank and its socket are made preferably cylindrical and tapering, being smallest at the inner ends. This drill-shank $d$ is made flat on one side for its entire length, as at $d'$, and likewise the stock B and its socket are cut away on the same side, as shown plainly in Fig. 5. As shown in this figure, the cut-away portion of the socket is seen to be square with and equal to the flat side of the drill-shank, while the exposed sides of the stock B are preferably at obtuse angles to the flat side of said drill-shank, so as to equalize the strain and prevent excessive wear at any one point.

After the shank of the drill has been inserted in the socket of the chuck-stock B it is securely fastened in place by a segmental-shaped key, E, made of a size to correspond with the cut-out portion of the stock B, both inside and outside of its entire length, and with a flat side, $e$, to exactly match the flat side of the drill-shank. This key extends back only as far as the screw-threads on the head of the stock, and all are secured in place by the outside sleeve, C.

By means of the flat-sided drill-shank and the flat-sided key it will be seen that the drill cannot turn in its socket, and, together with the tapering sides and flaring inner ends of the chuck-stock, key, and outside sleeve, it will be seen that the drill can have no lateral play, and hence our improvements establish a very strong and secure clamp for a drill or other tool of a similar kind.

Having thus described our invention, what we claim, and desire to secure by Letters Patent, is—

1. In combination, a drill-chuck provided with a socket, a drill provided with a shank having bearing its entire length in said socket, and a removable key for securing the drill, substantially as described.

2. In combination, a drill-chuck provided with a cylindrical socket, a drill provided with a cylindrical shank made flat on one side and having bearing its entire length in said socket, and a removable key made flat on one side, substantially as and for the purpose set forth.

3. In combination, a drill-chuck provided with a cylindrical socket, a drill provided with a cylindrical shank made flat on one side and having bearing its entire length in said socket, a removable key made flat on one side, and an outside sleeve screwed upon the chuck-stock, substantially as and for the purpose set forth.

4. In combination, a drill-chuck provided with a stock having a central cylindrical socket and a segmental opening in its side, a drill provided with a shank made flat on one side and having bearing its entire length in said socket, a removable key made flat on one side and inserted in said segmental opening, and an outside sleeve screwed upon said stock, substantially as described.

5. In combination, a drill-chuck provided with a stock having a tapering cylindrical exterior, with a flaring inner end, with a central cylindrical socket, and with a segmental opening in its side, a drill provided with a cylindrical shank made flat on one side and having bearing its entire length in said socket, a removable key made flat on one side and inserted in the segmental opening of the stock, and an outside sleeve screwed upon said stock and having a tapering cylindrical bore with a flaring inner end, substantially as and for the purposes set forth.

In testimony whereof we affix our signatures in presence of two witnesses.

JOHN DIXEY.
CHARLES GRONBERG.
PETER HYDEN.

Witnesses:
WILLIAM LANSDOWN,
NIEL PAULSON.